No. 648,688.
J. H. GREEN.
PROCESS OF MANUFACTURING GAS.
(Application filed Sept. 15, 1899.)
Patented May 1, 1900.
(No Model.)
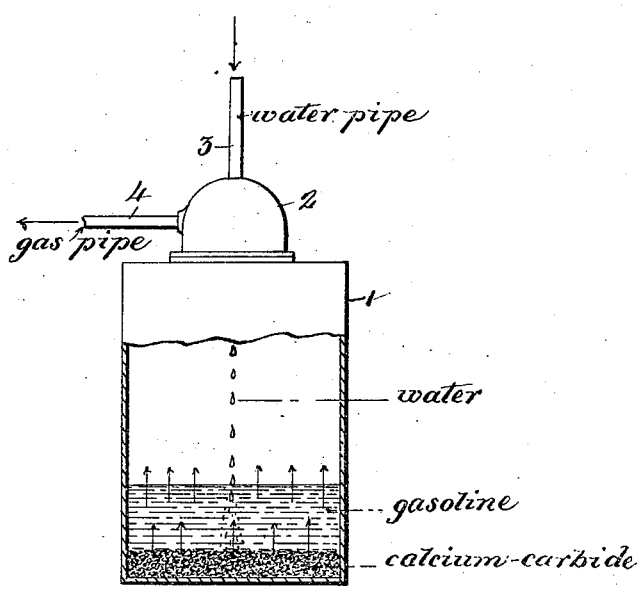
WITNESSES:
INVENTOR
John H. Green.
BY
ATTORNEYS

UNITED STATES PATENT OFFICE.

JOHN H. GREEN, OF ST. LOUIS, MISSOURI.

PROCESS OF MANUFACTURING GAS.

SPECIFICATION forming part of Letters Patent No. 648,688, dated May 1, 1900.

Application filed September 15, 1899. Serial No. 730,561. (No specimens.)

*To all whom it may concern:*

Be it known that I, JOHN H. GREEN, a citizen of the United States, residing at St. Louis, in the State of Missouri, have invented certain new and useful Improvements in Processes of Manufacturing Gas; and I do hereby declare the following to be a full, clear, and exact description of the invention, such as will enable others skilled in the art to which it appertains to make and use the same.

Heretofore it has been impossible to produce a gas from calcium carbid, such as used in the usual acetylene-machines for producing acetylene gas for cooking and heating, for the reason that such gas will not mix with ordinary air in a mixing-tube, such as commonly employed in connection with other gases, and therefore such acetylene gas could only be used for lighting purposes.

I have now discovered that by combining a mixture of liquid hydrocarbons, such as gasolene, with the calcium carbid and supplying the proper amount of water under the same principle and the same quantity as in all acetylene-gas-producing machines a gas can be produced which when mixed with ordinary air and ignited will produce a flame equal to that produced by coal or any other gas for the purpose stated at a minimum cost, the gas thus produced being also available for lighting purposes with the best results.

The drawing is a combined side elevation and sectional view of a vessel or can forming a part of the ordinary acetylene-gas machine, showing the mixture contained therein.

In carrying out my process I employ or use about three and one-half pounds calcium carbid to one quart of gasolene or a similar mixture of liquid hydrocarbons, which ingredient, together with the liquid hydrocarbons, is placed in a can, tank, or reservoir, so constructed as to be readily attached in its proper position to an acetylene-gas-producing machine, which machine automatically supplies a sufficient quantity of water to the mixed calcium carbid and liquid hydrocarbons contained in said can automatically at intervals and in the proper proportion, as in all machines of this character.

Referring to the drawing, 1 represents the usual vessel or can forming a part of the ordinary acetylene-gas machine; 2, a cap to which the same is removably attached; 3, a pipe for supplying water to the mixture contained within the can, and 4 a gas-pipe through which the gas passes from the vessel to the gasometer of said machine, all of which is of the well-known construction.

It is obvious that by combining the amount of calcium carbid and the quantity of liquid hydrocarbons in the proportions above described the liquid hydrocarbons will not only be thoroughly mixed with the calcium carbid, but the level thereof will be a considerable distance above the calcium carbid, whereby when the water is fed to the mixture the same will naturally pass through the liquid hydrocarbons and combine with the calcium carbid and produce gas from the latter in the usual manner; but said gas when produced will pass through the liquid hydrocarbons and there mix with the same, producing gas of the nature above described. Gas produced in the manner stated will not heat the tank or reservoir in which the same is generated, as is a common annoyance and objectional feature when gas is produced from the calcium carbid alone.

The gasolene or mixture of liquid hydrocarbons which I employ must be from 80° to 90°, or what is known as "high-test" liquid hydrocarbons, to produce the best results or a smokeless-flame when ignited and carried out according to the above description. It is obvious, however, that the above mixture of calcium carbid and liquid hydrocarbons may be made by the consumer instead of supplying the mixture in cans or receptacles to be attached to the machine by proper directions and description without departing from the nature of my discovery.

In carrying out my process as above described no water whatever remains in the mixture, as the small quantity of said water fed at intervals to the mixture combines immediately with the calcium carbid and produces gas, which passes through the liquid hydrocarbons above the same and produces the gas, as before described.

Having fully described my process, what I claim as new, and desire to secure by Letters Patent, is—

The herein-described process for manufacturing gas, which consists in placing in a vessel a suitable quantity of calcium carbid, and liquid hydrocarbons, and subsequently feeding a sufficient quantity of water at intervals to the mixture, whereby when the gas is generated by the water coming in contact with the calcium carbid, the same will pass through the liquid hydrocarbons, and simultaneously collect a sufficient quantity of gas from the same, in the manner described, and for the purpose set forth.

In testimony whereof I affix my signature in presence of two witnesses.

JOHN H. GREEN.

Witnesses:
C. F. KELLER,
ALFRED A. MATHEY.